(12) United States Patent
Ahrens, Jr. et al.

(10) Patent No.: US 6,281,860 B1
(45) Date of Patent: Aug. 28, 2001

(54) CUES FOR STATUS INFORMATION

(75) Inventors: George Henry Ahrens, Jr.; Mike Conrad Duron, both of Pflugerville; Robert Allan Faust, Austin; Forrest Clifton Gray, Austin; Kurt Paul Szabo, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/164,133

(22) Filed: Sep. 30, 1998

(51) Int. Cl.[7] .................................................... G09G 3/00
(52) U.S. Cl. ............................................. 345/30; 345/46
(58) Field of Search ............................... 345/30, 33, 34, 345/44, 46, 55, 59, 82, 84, 87; 710/19; 340/815.4, 815.44, 815.45, 815.53, 309.4

(56) References Cited

U.S. PATENT DOCUMENTS

| | | | |
|---|---|---|---|
| 5,423,006 | * 6/1995 | Brown et al. | 710/19 |
| 5,515,071 | * 5/1996 | Cho | 345/30 |
| 5,930,524 | * 7/1999 | Sasaki | 710/19 |
| 5,987,535 | * 11/1999 | Knodt et al. | 710/19 |

* cited by examiner

*Primary Examiner*—Regina Liang
(74) *Attorney, Agent, or Firm*—Robert V. Wilder; Leslie A. Van Leeuwen

(57) ABSTRACT

A method and implementing apparatus is provided which include a plurality of perceptible indicia devices which are mounted on an I/O drawer of a computer system server equipment rack. In the exemplary embodiment, the indicia devices include a light-emitting diode in combination with an alphanumeric display device. Various states of a system initialization process are indicated by different combinations of possible states of the LED and the display device such that the sequencing of a system initialization process can be traced by visual inspection of the status of the perceptible indicia devices.

20 Claims, 3 Drawing Sheets

| STATE | LED | OP PANEL |
|---|---|---|
| 1ST STANDBY POWER | BLINK | BLINK "U???.??" |
| 1ST SYSTEM POWER | SOLID | BLINK "U???.??" |
| RECEIVE FIRMWARE COMMUNICATION | SOLID | SOLID "UXXX.YY*" |
| THEREAFTER | SOLID | SOLID "UXXX.YY *" BLINKING ASTERISK |
| — | — | — |
| 2ND STANDBY POWER | BLINK | BLINK "UXXX.YY" |
| 2ND SYSTEM POWER | SOLID | BLINK "UXXX.YY" |
| RECEIVE FIRMWARE COMMUNICATION | SOLID | SOLID "UXXX.YY*" |
| THEREAFTER | SOLID | SOLID "UXXX.YY *" BLINKING ASTERISK |

*FIG. 5*

CUES FOR STATUS INFORMATION

FIELD OF THE INVENTION

The present invention relates generally to information processing systems and more particularly to devices for providing indicia representative of system status information.

BACKGROUND OF THE INVENTION

Computer systems and computer related systems are becoming commonplace in today's workplace and homes. Both personal computers and larger systems including workstations and networked computer terminals, are being applied to new applications daily. In these and other electronic systems, when the system is started-up or "initialized", there are several operations or steps that are executed before the system is ready for use. Occasionally, for any of various reasons, the system does not complete the initialization steps and gets "hung-up" during the initialization and an error message, for example, may be displayed to a user.

In networked systems, which include server units, the servers include panels or drawers of I/O (input-output) components mounted in racks which are physically displaced from any user or display device. When a server does not initialize properly, it is sometimes difficult to determine the point at which the initialization process failed.

Although it is possible to provide software support for initialization error detection, such programs may only provide an error message on a system display CRT that the initialization process did not complete. In many cases, the display CRT is at a location displaced from the system hardware racks which include the electronics and boards which would need to be checked. Moreover, the exact cause or point at which the failure occurred is not known or is not displayed. Accordingly, when the system is being checked-out to for the cause of the failure, the start-up or initialization process must be run again to attempt to determine at what point in the initialization process the failure occurred.

Moreover, in systems which are shipped to international customers, software de-bugging solutions are sometimes difficult to implement because of the number of languages to which the error and other information must be translated before being communicated to repair personnel for system repair and/or maintenance.

Thus, there is a need for an improved method and apparatus for communicating error and other system initialization and other operating information to personnel responsible for system operation and/or maintenance.

SUMMARY OF THE INVENTION

A method and apparatus is provided which is effective to communicate various states of operation of an electronics system by sequentially operating a plurality of perceptible indicia combinations representative of an operational execution sequence. In one exemplary embodiment, first and second perceptible indicia devices include a light-emitting diode in combination with an alphanumeric display device, which are both mounted on an I/O drawer of a computer system server equipment rack. Various states of a system initialization process are indicated by different combinations of possible states of the LED and display devices such that the sequencing of an initialization process can be determined by inspection of the status of the perceptible indicia devices.

BRIEF DESCRIPTION OF THE DRAWINGS

A better understanding of the present invention can be obtained when the following detailed description of a preferred embodiment is considered in conjunction with the following drawings, in which:

FIG. 5 is a table illustrating various possible combinations of the indicia device states corresponding to various possible system initialization status states for the exemplary server system.

DETAILED DESCRIPTION

Figure 1:
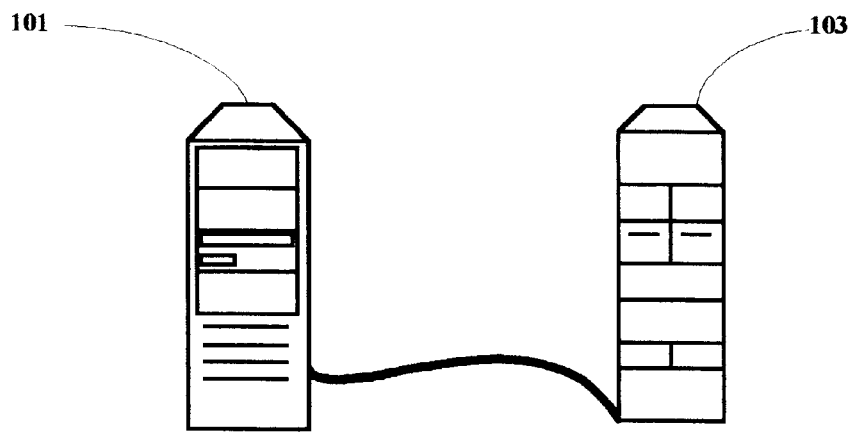
FIG. 1 is an illustration of an exemplary computer system arrangement including a server main cabinet and an I/O cabinet.
Figure 2:
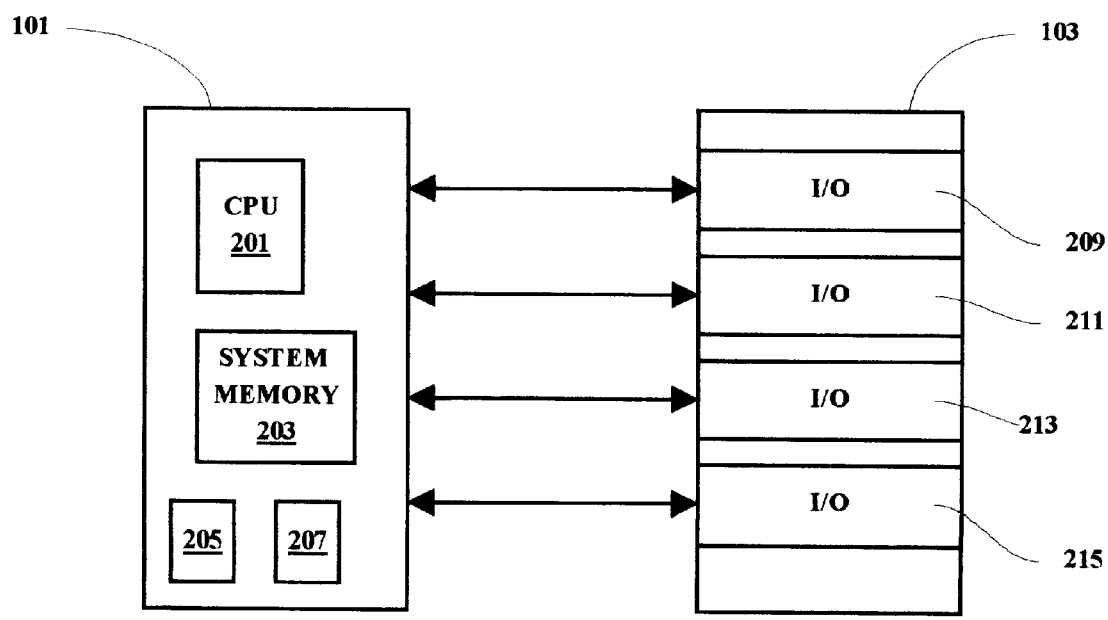
FIG. 2 is a schematic diagram illustrating several of the components and subsystems of the exemplary computer system.

The various methods discussed herein may be implemented within any electronics system. In the present example, the disclosed methodology is implemented in a computer system, as illustrated in FIG. 1 and FIG. 2, which includes various functional units such as a main enclosure 101 for housing the main computer components and subsystems, and an input/output (I/O) enclosure 103 for housing I/O subsystems and connections. An exemplary hardware configuration of a computer system which may be used in conjunction with the present invention includes one or more central processing units or CPUs 201, and a number of other units such as system memory 203 and other functional integrated circuits or subsystems 205 and 207 which are interconnected through a system bus (not shown). It is noted that the connection and processing methodology disclosed herein will apply to many different bus and/or network configurations. In the present example, four I/O units 209, 211, 213 and 215 are shown connected to the main computer unit 101.

As hereinbefore discussed, it is desired to provide indicia on an I/O drawer 209 to indicate the status of the computer system (101, 103) being operated. In the present example, the system illustrated in FIG. 1 is typically connected to a remotely located server administrator terminal (not shown) which, in turn, includes an operator display device. The present invention is directed to an indicia device combination located at a subsystem equipment site, such as on a front panel of a system I/O drawer 209 which may be mounted on a system or subsystem equipment rack or cabinet 103.

In the exemplary system, as is the case with many electronics systems and subsystems, when the system is first turned-on or initiated, several phases or stages of power-up are undertaken. Initially, only "stand-by" power is distributed to key components of the system including a service processor or micro-controller (not shown). The service processor or service micro-controller generates a series of "handshake" signals which are distributed throughout the system in preparation for the main power-up of the system. After the stand-by power-on stage, the system begins a main system power-up stage in which the main computing components of the computer system receive full power and become operational following a series of system configuration and operational "checks" for operability. In a third stage, the system provides identification (ID) information to the I/O drawer which is representative of the ID number assigned to the I/O drawer by the system. Prior to that point in time, the I/O drawer does not know what its system ID number is. The final stage or state of the system initialization occurs when the system sends a command known as "resync". That command tells the drawer that the system is configured and communicating. At that time the drawer should be running normally.

Figure 3:
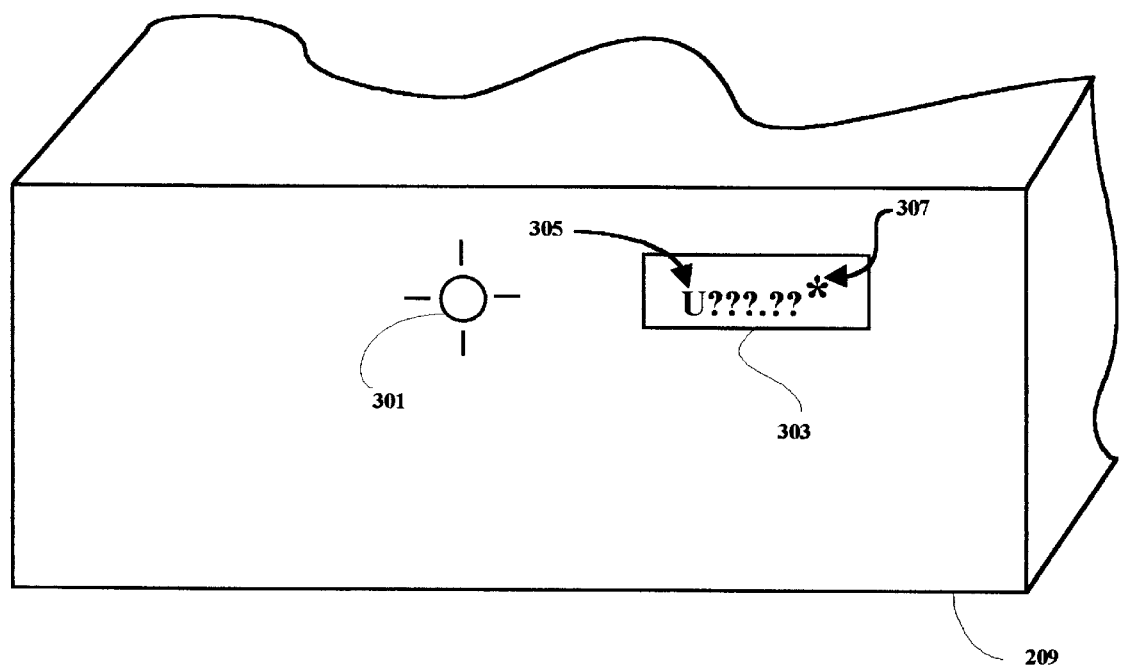
FIG. 3 is an illustration of a panel of one of the I/O drawers, showing two indicia devices mounted thereon.

To convey the various states or stages of the initialization process, two indicia devices are implemented on the front panel of an I/O device such as I/O device 209. As shown in FIG. 3, in the present example, a first indicia device is implemented by a light-emitting diode 301 and a second indicia device is implemented in the form of an LCD (liquid crystal display) 303. It will be understood that the number and type of indicia devices may vary according to the particular needs of various applications. For example, LEDs or LCDs or even color related displays may be used as visual devices, and other perceptible indicia devices such as audio devices may also be implemented alone or in combination with the visual indicia devices used in the present example. As shown in FIG. 3, the LCD 303 is capable of displaying alphanumeric fields of information 305 including symbols such as asterisk 307. In addition, both the LED 301 and the alpha display 305 are capable of providing blinking or off-and-on states of the devices as a different indication from a solidly displayed LED or field of information.

Figure 4:
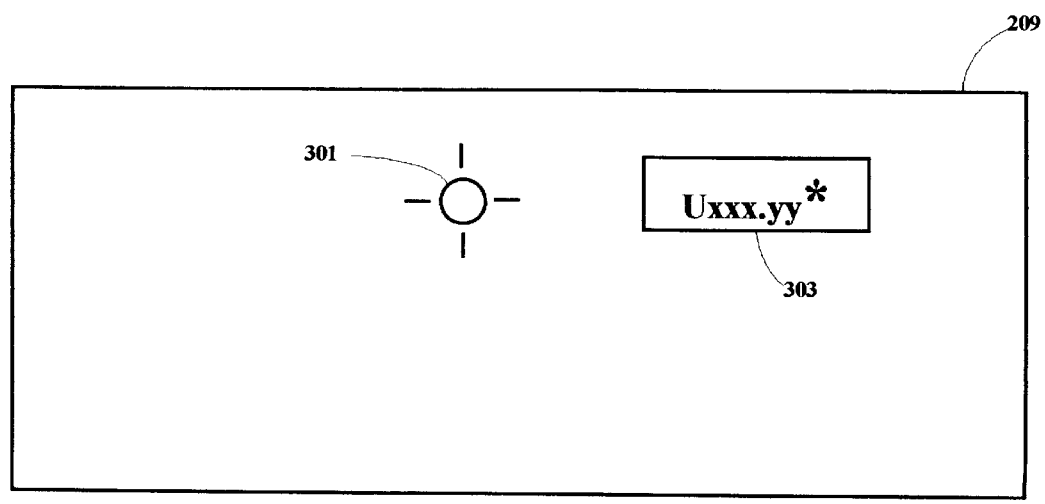
FIG. 4 is another illustration of the panel face shown in FIG. 3 showing a different combination of states for the indicia devices.

In an exemplary operation, reference is made to the indicia devices 301 and 303 in FIG. 3 and FIG. 4, and also to the table of sequential system states shown in FIG. 5. As hereinbefore noted, the first state assumed by the system is the "stand-by power" state. The existence of that state in the present example is indicated by the blinking of the LED 301 and by the concurrent blinking of the I/O drawer ID field. The ID field at this point may include the display of question marks since at this initial state the I/O drawer does not yet have an ID field assigned by the system.

After the initial "standby power" state, the system next goes into a second state which in the present example is a "system power" state. In the "system power" state, the LED 301 glows solidly without blinking. The alpha LCD device 303 will continue, however, to blink its indeterminate field including question marks since the ID number of the drawer has still not yet been communicated to the I/O drawer 209. The next state assumed by the system is one in which the drawer ID is determined and communicated to the I/O drawer 209 from the system. At that time, the LED continues to glow without blinking assuming the system power continues to be applied. Also, the communicated ID number is now displayed on the LCD 303 along with a blinking asterisk. This is illustrated by the ID number "UXXX.YY*" in the example. The question marks no longer appear in the ID field 305 of the LCD 303. The blinking asterisk indicates that the drawer is running normally. The asterisk will continue to blink (like a heartbeat) until system power is lost. After the first system initialization, in the event the system goes down for some reason, the second and subsequent system initializations will provide indicia of system status as hereinbefore explained except that the I/O drawer will "remember" its ID number from the first firmware communication of the ID number. Accordingly, the known ID number will appear without question marks during the "standby power" stage and thereafter, during the second and subsequent initializations of the system. This language-independent sequence of displayed changes in the LED 301 and the LCD 303 provide perceptible context-sensitive indicia corresponding to the start-up initialization states of the system, and are easily communicated to system users in all countries and in all languages.

The disclosed methodology creates a perceptible series of indicia to indicate the initialization sequencing from start-up to steady state. If a failure occurs during this series of states, it can be determined by examining the state of the LED 301 and the LCD 303, at which state the initialization process failed. Among many other uses to which this methodology can be applied, the time taken for the various stages of the initialization can also be determined by observing the states and transitions between states of the indicia devices.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for providing a sequence of indications corresponding to a plurality of operational stages through which a system progresses following a system start-up, said method comprising:

activating a first indicating device to assume a first of a plurality of possible perceptible states of said first indicating device upon detection of a first of said operational stages;

activating a second indicating device to assume a first of a plurality of possible perceptible states of said second indicating device upon detection of said first of said operational stages; and changing at least one of said perceptible states of at least one of said first and second indicating devices upon detecting a second of said operational stages.

2. The method as set forth in claim 1 and further including:

changing at least one of said perceptible states of one of said first and second indicating devices each time a change of said operational stages is detected.

3. The method as set forth in claim 1 wherein only one of said possible perceptible states of said first and second indicating devices is changed upon detecting a changed operational stage.

4. The method as set forth in claim 1 wherein at least one of said first and second indicating devices is selectively operable to provide visible perceptible states.

5. The method as set forth in claim 1 wherein at least one of said first and second indicating devices is selectively operable to provide a perceptible state other than a visible perceptible state.

6. The method as set forth in claim 1 wherein said first indicating device is a light emitting device, said method further including:

effecting a blinking of said light emitting device during one of said operational stages.

7. The method as set forth in claim 6 wherein said light emitting device is a light emitting diode.

8. The method as set forth in claim 1 wherein said second indicating device is a display device capable of selectively displaying a character field comprising a series of characters.

9. The method as set forth in claim 8 wherein said second indicating device is selectively operable to display an identification character field received from said system during said system start-up.

10. The method as set forth in claim 8 wherein said perceptible states of said second indicating device include a blinking display of said identification character field and a non-blinking display of said identification character field.

11. The method as set forth in claim 2 wherein at least one of said first and second indicating devices is selectively operable to provide visible perceptible states.

12. The method as set forth in claim 2 wherein at least one of said first and second indicating devices is selectively operable to provide a perceptible state other than a visible perceptible state.

13. The method as set forth in claim 2 wherein said first indicating device is a light emitting device, said method further including:

effecting a blinking of said light emitting device during one of said operational stages.

14. The method as set forth in claim 13 wherein said light emitting device is a light emitting diode.

15. The method as set forth in claim 2 wherein said second indicating device is a display device capable of selectively displaying a character field comprising a series of characters.

16. The method as set forth in claim 15 wherein said second indicating device is selectively operable to display an identification character field received from said system during said system start-up.

17. The method as set forth in claim 15 wherein said perceptible states of said second indicating device include a blinking display of said identification character field and a non-blinking display of said identification character field.

18. A display device combination mounted on an enclosure, said enclosure being arranged to enclose circuitry selectively operable upon start-up of the circuitry to progress through a series of operational stages before attaining a steady state condition, said display device combination comprising:

a first indicating device coupled to said circuitry, said first indicating device being selectively operable to assume a first of a plurality of possible perceptible states of said first indicating device upon detection of a first of said operational stages;

a second indicating device coupled to said circuitry, said second indicating device being selectively operable to assume a first of a plurality of possible perceptible states of said second indicating device upon detection of said first of said operational stages, said display device combination being responsive to a change in said operational stages for changing at least one of said perceptible states of at least one of said first and second indicating devices.

19. The display device combination as set forth in claim 18 wherein said display device combination is further effective for changing at least one of said perceptible states of one of said first and second indicating devices each time a change of said operational stages is detected.

20. The display device combination as set forth in claim 18 wherein only one of said possible perceptible states of said first and second indicating devices is changed upon detecting a changed operational stage.

* * * * *